United States Patent
Yamada et al.

[11] Patent Number: 6,018,399
[45] Date of Patent: Jan. 25, 2000

[54] IMAGE PROCESSING DEVICE WHICH DISCRIMINATES EFFECTIVELY BETWEEN CHARACTER PIXELS AND HALFTONE PIXELS

[75] Inventors: Hideaki Yamada, Ichihara; Yuuki Takeda, Chiba, both of Japan

[73] Assignee: Sharp Kabushiki Kaisha, Osaka, Japan

[21] Appl. No.: 08/931,700

[22] Filed: Sep. 16, 1997

[30] Foreign Application Priority Data

Sep. 24, 1996 [JP] Japan ...................................... 8-251121

[51] Int. Cl.$^7$ ...................................................... H04N 1/40
[52] U.S. Cl. ............................................ 358/1.9; 358/462
[58] Field of Search ................... 395/109; 382/270–273, 382/224–228, 173, 176; 358/462, 466, 1.9

[56] References Cited

U.S. PATENT DOCUMENTS

| | | | |
|---|---|---|---|
| 5,016,118 | 5/1991 | Nannichi | 358/462 |
| 5,018,024 | 5/1991 | Tanioka | 358/462 |
| 5,260,810 | 11/1993 | Kanno et al. | 358/462 |
| 5,331,442 | 7/1994 | Sorimachi | 358/462 |

FOREIGN PATENT DOCUMENTS 59-218076  12/1984  Japan .

*Primary Examiner*—Thomas D. Lee
*Assistant Examiner*—Stephen Brinich
*Attorney, Agent, or Firm*—Dike, Bronstein, Roberts & Cushman, LLP; David G. Conlin; William J. Daley, Jr.

[57] ABSTRACT

The present invention is directed to an image processing device that can prevent the occurrence of moire patterns when processing a dot image. An image processing device according to the present invention comprises an image memory for storing multi-gradational image data, an area-deciding portion for deciding an area of pixels PIX (x, y) of a multi-gradational image stored in the memory and outputting a decision signal SEL=0 when the pixel is a character area pixel or a decision signal SEL=1 when the pixel is a halftone area, a binarizing portion for character for binarizing a character image pixel PIX (x, y) of the multi-gradational image data stored in the memory and outputting a binarized image data L, a binarizing portion for photograph for binarizing a halftone image pixel PIX (x, y) of the multi-gradational image data stored in the memory and outputting a binarized image data P, an output selecting portion for selectably outputting binarized image data B which is the binarized image output L from the binarizing portion for character when the output SEL of the area deciding portion is 1 or the binarized image output P from the binarizing portion for photograph when the output SEL is 0, and a memory for storing binarized image data outputted from the output selecting portion.

3 Claims, 4 Drawing Sheets

IMAGE PROCESSING DEVICE WHICH DISCRIMINATES EFFECTIVELY BETWEEN CHARACTER PIXELS AND HALFTONE PIXELS

BACKGROUND OF THE INVENTION

In a usual facsimile transmission, a sending terminal reads an original image as multi-valued image data by an incorporated scanner, converts the data into binary image data and sends the converted binary data to the receiving terminal, which outputs the received binary image data for printing the data on recording paper.

The conventional image processing device converts multi-valued image data into binary image data in the following way:

First, an original image is divided into character-image areas and halftone (e.g., photographic) image areas.

Means of discriminating between the character image areas and the halftone image areas are usually called as area deciding means.

The area decision is made firstly by examining whether an optical density value of an objective pixel to be examined is within a range between a specified black threshold and a specified white threshold and secondly by examining whether a difference of the density value of the objective pixel from an average density value of four pixels existing in above left, above right, below left and below right of the objective pixel is equal or smaller than a specified threshold value. The objective pixel is decided as a halftone area if said pixel satisfies both conditions as the result of the examinations. The objective pixel is decided as a character area if it does not satisfy both conditions at a time as the result of the examinations.

The halftone pixel thus decided is binarized by a dithering with error diffusion method. A pixel judged as a character area pixel is binarized by using a specified threshold value, and omitting the dithering process, that may impair the quality of character information halftone image represented by halftone dots of a larger size than a certain value of roughness cannot be processed without causing moire fringes by a conventional image processing device. Moire fringes may be produced because the conventional image processing device periodically mistakes an image represented by halftone dots for a character image.

In the conventional image processing device, an area of each of the pixels read by scanning the original image is decided by reference to four pixels existing in just upper, lower, left and right of each objective pixel. In this case, each objective pixel is judged to be of a character area if a difference cyclically exceeds a certain threshold value.

In this halftone dot image, pixels at positions of a certain cycle are misjudged to be of a character area because the differential values of its density from an average density value of the reference pixels exceed the threshold value. These misjudgments cause moire patterns in the image when reproduced.

SUMMARY OF THE INVENTION

The present invention relates to an image processing device and more particularly to an image processing device used for converting multivalued image data into binary image data in a binary-image-data transmission system such as a facsimile transmission system.

The present invention is directed to an image processing device that properly decides pixels to be of a character image area and is protected against the occurrence of moire fringe patterns.

To achieve the above-mentioned object, the present invention provides an image processing device which comprises area deciding means, character-binarizing means for binarizing character image areas, photograph-binarizing means for binarizing halftone image areas (e.g., photographic image areas) and output means for selectably outputting binarized data for character and binarized data for photograph according to the area decision results, wherein the area deciding means for discriminating between character areas and halftone areas (e.g., photographic image areas) by sequentially checking pixels of multi-gradational image data pixel by pixel decides an objective pixel area by referring to four pixels existing in above left of above left, above right of above right, below left of below left and below right of below right respectively of the objective pixel.

This image processing device is further provided with a first memory for storing the multi-gradational image data and a second memory for storing the binarized data.

In the above-mentioned image processing device, a multi-gradational image data is stored in the first memory and then subsequently read pixel by pixel and decided as character area pixels or halftone (e.g., photographic image) area pixels. Simultaneously, character pixels and halftone (e.g., photographic image) pixels are binarized respectively. The binarized data for character and the binarized data for photograph are selectably outputted pixel by pixel according to the above-described area-deciding results. The binarized image data is stored in the second memory.

In the process of subsequently deciding the character areas and halftone (e.g., photographic image) areas of the multi-gradational image data, each objective pixel area is decided by reference to four neighboring pixels existing in above left of above left, above right of above right, below left of below left and below right of below right of the objective pixel.

PREFERRED EMBODIMENTS OF THE INVENTION

Prior to explaining preferred embodiments of the present invention, an image processing device basic art on which the present invention stand, will be described below as references for the present invention.

In a usual facsimile transmission, a sending terminal reads an original image as multi-valued image data by an incorporated scanner, converts the data into binary image data and sends the converted binary data and the receiving terminal outputs the received binary image data for printing the data on recording paper.

The conventional image processing device converts multi-valued image data into binary image data in the following way:

First, an original image is divided into character-image areas and halftone (e.g., photographic) image areas.

Means of discriminating between the character image areas and the halftone image areas are usually called as area deciding means.

The area decision is made firstly by examining whether an optical density value of an objective pixel to be examined is within a range between a specified black threshold and a specified white threshold and secondly by examining whether a difference of the density value of the objective pixel from an average density value of four pixels existing in above left, above right, below left and below right of the objective pixel is equal or smaller than a specified threshold value. The objective pixel is decided as a halftone area if said pixel satisfies both conditions as the result of the examinations. The objective pixel is decided as a character area if it does not satisfy both conditions at a time as the result of the examinations.

The halftone pixel thus decided is binarized by a dithering with error diffusion method. A pixel judged as a character area pixel is binarized by using a specified threshold value, and omitting the dithering process that may impair the quality of character information.

A halftone image represented by halftone dots of a larger size than a certain value of roughness cannot be processed without causing moire fringes by a conventional image processing device. Moire fringes may be produced because the conventional image processing device periodically mistakes an image represented by halftone dots for a character image.

Figure 1:
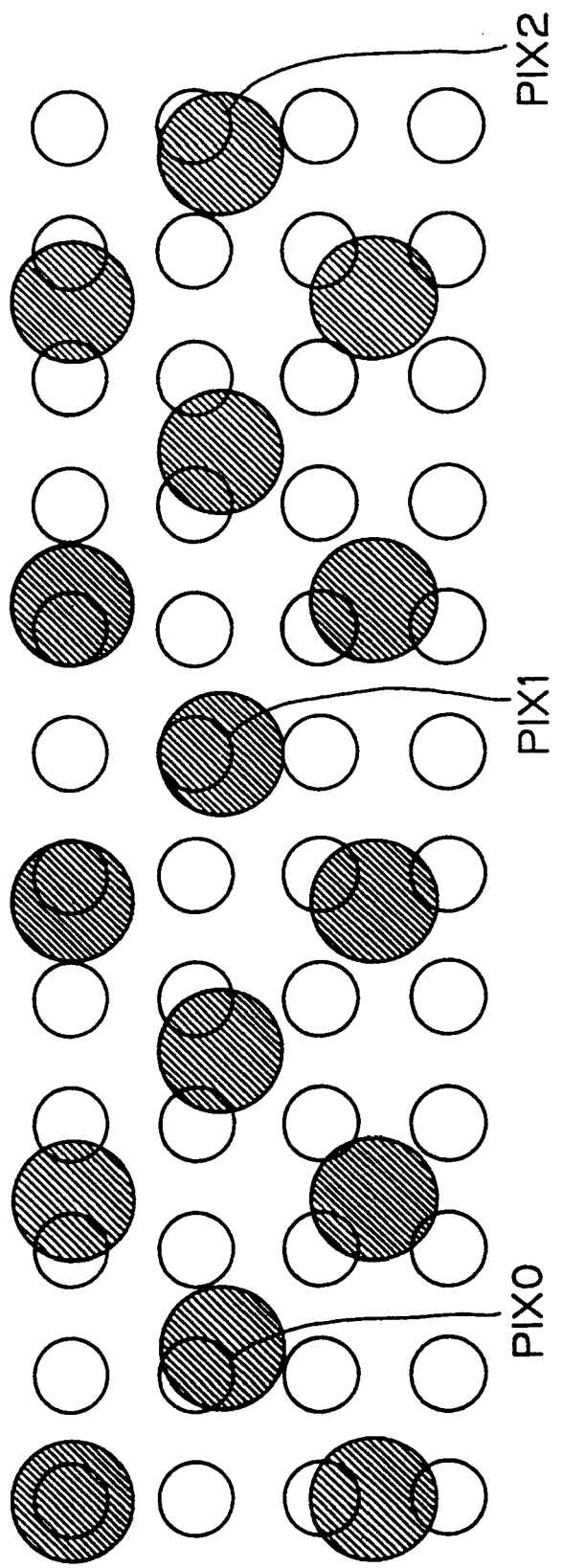
FIG. 1 is illustrative of a correlation between a dot image and positions thereon to be read by scanning by a conventional image processing.

FIG. 1 shows a relation between a dot image and positions thereon to be read by a scanner of a conventional video processing device to explain a reason for causing a moire pattern. In FIG. 1, white circles show positions readable by the scanner and black circles (with hatching therein) show halftone dots composing the halftone dot image.

In the conventional image processing device, an area of each of the pixels read by scanning the original image shown in FIG. 1 is decided by reference to four pixels existing in just upper, lower, left and right of each objective pixel. In this case, each objective pixel is judged to be of a character area if a difference cyclically exceeds a certain threshold value.

In this halftone dot image of FIG. 1, pixels at positions of a certain cycle PIX0, PIX1 and PIX2 are misjudged to be of a character area because the differential values of its density from an average density value of the reference pixels exceed the threshold value. These misjudgments cause moire patterns in the image when reproduced.

A preferred embodiment of the present invention will be described.

Figure 2:
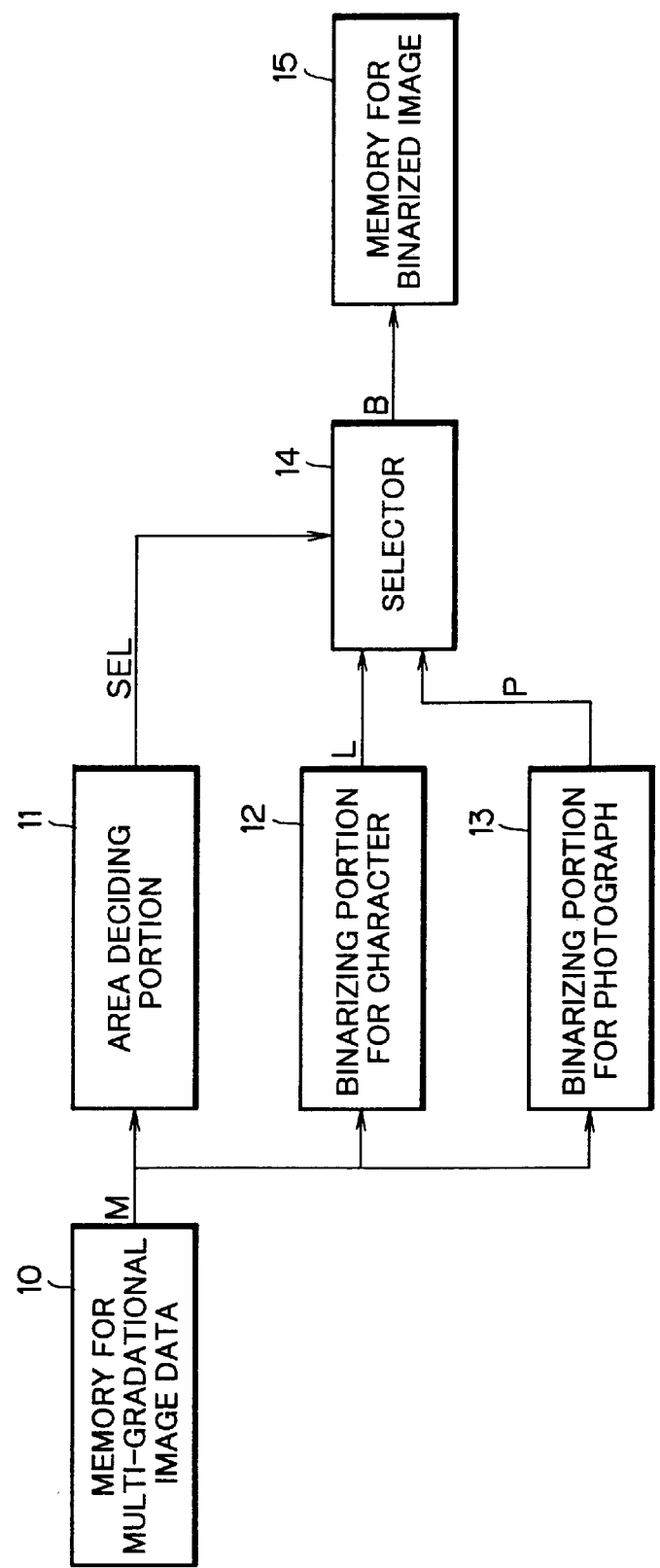
FIG. 2 is a block diagram showing a general construction of an image processing device according to the present invention.

FIG. 2 is a block diagram showing a general construction view of an image processing device according to the present invention.

As shown in FIG. 2, this image processing device comprises: a memory 10 for storing multi-gradational image data; an area deciding potion 11, connected to the memory 10, for deciding areas of multi-gradational pixels PIX (x, y) stored in the memory 10 by outputting a signal of SEL=0 when PIX (x, y) is of a character-image area or a signal of SEL=1 when a pixel PIX (x, y) is of a halftone-image area; a binarizing portion for character 12, connected to the memory 10, for character-binarizing the multi-gradational image data PIX (x, y) stored in the memory 10 and outputting binarized image data L;

a binarizing portion for photograph 13, connected to the memory 10, for halftone-image (e.g., photographic image) binarizing the multi-gradational image data PIX (x, y) stored in the memory 10 and outputting binarized image data P;

an output selecting portion (selector) 14, connected to the area deciding portion 11, the binarizing portion for character 12 and the binarizing portion for photograph 13, for selectably outputting a binarized image data L from the binarizing portion for character 12 when the area deciding portion 11 outputs SEL=0 or a binarized image data B to be changed over the binarized image data P from the binarizing portion for photograph 13 when the area deciding portion 11 outputs SEL=1; and a memory for binarized image 15, connected to the output selecting portion 14, for receiving and storing binarized image data B outputted from the output selecting portion 14.

Figure 3:
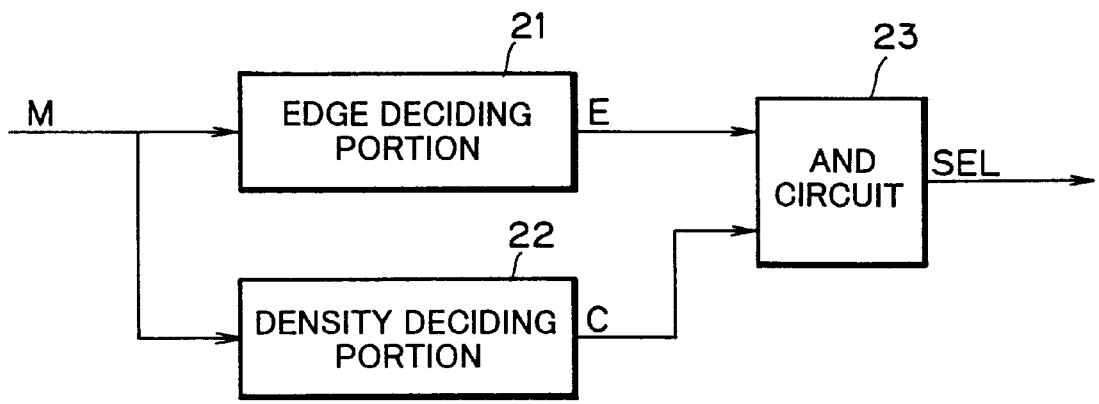
FIG. 3 is a block diagram showing a detailed construction of an area deciding portion of an image processing device according to the present invention.

FIG. 3 is a block diagram for explaining the detailed structure of the area deciding portion 11 shown in FIG. 2.

This area deciding portion 11 comprises: an edge deciding portion 21 that reads multi-gradational image data, examines whether an objective pixel at PIX (0, 0) satisfy a specified condition by reference to 4 pixels existing at PIX (−2, −2), PIX (2, −2), PIX (−2, 2) and PIX (2, 2) shown in FIG. 4 (hereinafter described), and outputs a decision signal C=1 when the condition is satisfied or a decision signal C=0 when the condition is not satisfied; a density deciding portion 22 that examines whether the objective pixel satisfies a specified condition and outputs a decision signal C=1 when the condition is satisfied or a decision signal C=0 when the condition is satisfied; and an AND circuit 23 that presents an output SEL corresponding to a logical AND for inputs E and C.

The density deciding portion 22 judges whether the following conditional equation (1) is satisfied or not. In the equation (1), Q (0, 0) designates the density of an objective pixel PIX (0, 0) to be decided as character area or halftone area. TB designates a threshold value for discriminating the black density level and TW designates a threshold value for discriminating the white density level.

$$TB \leq Q(0, 0) \leq TW \tag{1}$$

Figure 4:
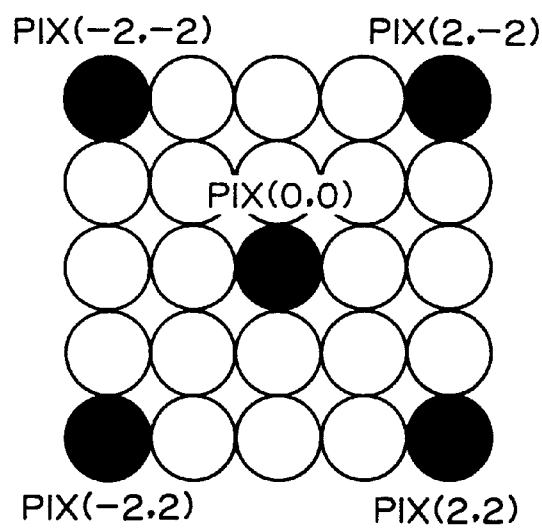
FIG. 4 is a block diagram showing a detailed construction of an edge deciding portion of an image processing device according to the present invention.

FIG. 4 is a view for explaining the edge deciding portion 21 shown in FIG. 3. This edge deciding portion 21 refers to 4 pixels existing at PIX (−2, −2), PIX (2, −2), PIX (−2, 2) and PIX (2, 2) according to Equation (2) (to be described below) and outputs a decision signal E=1 when said equation is satisfied or a decision signal E=0 when the equation is not satisfied. In this case, the density values of pixels PIX (−2, −2), PIX (2, −2), PIX (−2, 2) and PIX (2, 2) are expressed by Q (−2, −2), Q (2, −2), Q (−2, 2), and Q (2, 2) respectively. In Equation (2), Q max is a maximum of the density values Q (−2, −2), Q (2, −2), Q (−2, 2), Q (2, 2) and Q min is a minimum of the density values Q (−2, −2), Q (2, −2), Q (−2, 2), Q (2, 2). TE is a threshold value for judging an objective pixel to be of an edge.

$$Q\,max - Q\,min \leq TE \tag{2}$$

Figure 5:
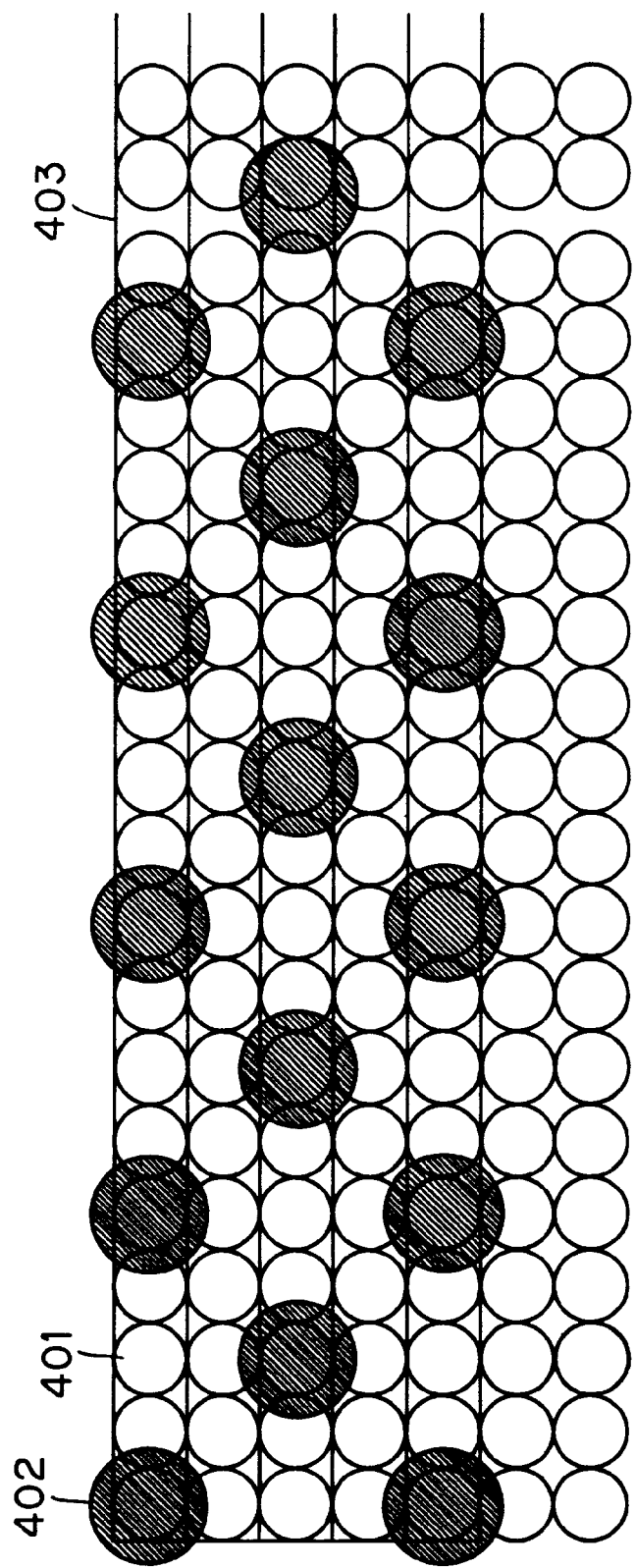
FIG. 5 is illustrative of a correlation between a dot image and positions thereon to be read by scanning by an image processing device according to the present invention.

FIG. 5 shows a dot image and positions thereon to be readable by a scanner of an image processing device according to the present invention. The shown image relates to multi-gradational image data used in an embodiment of the present invention. The multi-gradational image data has the resolution of 200 digits/inch. A pixel 401 shows a position of a pixel to be read by the scanner. A black circle 402 is a dot component of a dot image of a 65 lines/inch. A line memory 403 stores a multi-gradational image. The shown embodiment requires 5 line memories.

As shown in FIG. 5, each of the pixels in a multi-gradational image read by the scanner is discriminated to be of a character image area or a halftone (photographic) image area by reference to four neighboring pixels existing in above left of above left, above right of above right, below left of below left and below right of below right of the pixel. This method well adapted to cover the scanner's reading period of 200 dpi and a dot image of 65 lines/inch (of, e.g., newspaper) and can discriminate between halftone image areas and character image areas even in the dot image at an improved accuracy in comparison with the conventional method.

According to the present invention, an objective pixel area in a multi-gradational image read by a scanner is decided by reference to neighboring pixels existing in above left of above left, above right of above right, below left of below left and below right of below right of the objective pixel, so the discrimination between character areas and halftone areas in dot image can be realized at an increased accuracy as compared with the conventional method.

We claim:

1. An image processing device comprising area deciding means for discriminating an objective pixel to be of a character image area or a halftone image area by sequentially checking pixels of multi-gradational image data, pixel by pixel, character-binarizing means for binarizing character image areas, photograph-binarizing means for binarizing halftone image areas, and output means for selectably outputting binarized data for character and binarized data for halftone according to the area decision results;

wherein the area deciding means for discriminating the objective pixel to be of a character image area or a halftone image area by sequentially checking pixels of multi-gradational image data pixel by pixel decides which area a particular pixel is in by reference to a set of pixels consisting of four pixels at the following locations: (a) above and to the left of a pixel located above and to the left of the particular pixel, (b) above and to the right of a pixel located above and to the right of the particular pixel, (c) below and to the left of a pixel located above and to the left of the particular pixel, and (d) below and to the right of a pixel located above and to the right of the particular pixel.

2. An image processing device as defined in claim 1, wherein a first memory for storing the multi-gradational image data is provided.

3. An image processing device as defined in claim 1 or 2, wherein a second memory for storing the binarized data is provided.

* * * * *